(12) United States Patent
Han et al.

(10) Patent No.: US 7,890,470 B2
(45) Date of Patent: Feb. 15, 2011

(54) METHOD AND APPARATUS FOR SYNCHRONIZING DEVICE PROVIDING CONTENT DIRECTORY SERVICE WITH DEVICE NOT PROVIDING CONTENT DIRECTORY

(75) Inventors: Se-hee Han, Seoul (KR); Joo-yeol Lee, Seoul (KR); Seung-jae Oh, Seoul (KR); Dong-shin Jung, Suwon-si (KR); Won-seok Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 420 days.

(21) Appl. No.: 11/741,783

(22) Filed: Apr. 30, 2007

(65) Prior Publication Data

US 2007/0271310 A1 Nov. 22, 2007

Related U.S. Application Data

(60) Provisional application No. 60/796,892, filed on May 3, 2006.

(30) Foreign Application Priority Data

Nov. 14, 2006 (KR) ...................... 10-2006-0112445

(51) Int. Cl.
*G06F 17/30* (2006.01)

(52) U.S. Cl. ...................... 707/656; 707/200; 707/201; 707/609; 707/610

(58) Field of Classification Search ....................... None
See application file for complete search history.

(56) References Cited

U.S. PATENT DOCUMENTS

| | | | |
|---|---|---|---|
| 2003/0183064 A1* | 10/2003 | Eugene et al. | 84/609 |
| 2004/0201617 A1* | 10/2004 | Jung et al. | 345/738 |
| 2004/0208480 A1* | 10/2004 | Yoon et al. | 386/69 |
| 2006/0159109 A1* | 7/2006 | Lamkin et al. | 370/401 |
| 2006/0179138 A1* | 8/2006 | Van Gassel et al. | 709/225 |
| 2006/0218180 A1* | 9/2006 | Bodlaender et al. | 707/103 R |
| 2009/0024717 A1* | 1/2009 | Im | 709/218 |

FOREIGN PATENT DOCUMENTS

| | | |
|---|---|---|
| EP | 1710979 A2 | 10/2006 |
| EP | 1710979 A3 | 11/2006 |
| WO | 2005/079071 A1 | 8/2005 |

* cited by examiner

*Primary Examiner*—Don Wong
*Assistant Examiner*—Shyue Jiunn Hwa
(74) *Attorney, Agent, or Firm*—Sughrue Mion, PLLC

(57) ABSTRACT

Provided is a method for synchronizing contents included in devices in a Universal Plug and Play (UPnP) network. A control point device, which contains local content but cannot provide a content directory service, converts information regarding content objects of the control point device into Digital Item Description Language Lite (DIDL-Lite) format, and manages a mapping table, thereby performing synchronization with a device such as a UPnP media server providing a content directory service, without loading a separate protocol stack.

11 Claims, 4 Drawing Sheets

| Local Path | DIDL-Lite Metadata |
|---|---|
| c:\MyMusic | <DIDL-Lite><container id=1 parentID=0...></DIDL-Lite> |
| c:\MyMusic\a.mp3 | <DIDL-Lite><item id=2 parentID=1...></DIDL-Lite> |

METHOD AND APPARATUS FOR SYNCHRONIZING DEVICE PROVIDING CONTENT DIRECTORY SERVICE WITH DEVICE NOT PROVIDING CONTENT DIRECTORY

CROSS-REFERENCE TO RELATED PATENT APPLICATION

This application claims the benefit of Korean Patent Application No. 10-2006-0112445, filed on Nov. 14, 2006, in the Korean Intellectual Property Office, and the benefit of U.S. Provisional Patent Application No. 60/796,892, filed on May 3, 2006, in the U.S. Patent and Trademark Office, the disclosures of which are incorporated herein in their entirety by reference.

BACKGROUND OF THE INVENTION

1. Field of the Invention

Methods and apparatuses consistent with the present invention relate to synchronizing home network devices, and more particularly, to synchronizing contents contained in devices in a Universal Plug and Play (UPnP) network.

2. Description of the Related Art

Universal Plug and Play (UPnP), which is a protocol for sensing and controlling electrical appliances connected to a network, is a home networking standard. A UPnP AV (Audio/Video) architecture was developed for utilizing multimedia content, such as audio/video, etc., on the basis of the UPnP standard.

The UPnP AV architecture consists of a media server, a media renderer, and a control point for controlling the media server and the media renderer. The media server provides multimedia files through a content directory service, and the media renderer reproduces the multimedia files. The control point controls the media server and the media renderer so that they can operate by interacting with each other. The content directory service provides metadata regarding contents used both inside and outside of a home network. The control point acquires information regarding content by means of the content directory service, and sends requests to the media renderer to reproduce the content.

If such a UPnP AV architecture is established, a plurality of media servers can exist in a home network, wherein the media servers can contain different content. In a UPnP AV environment, a user may want to easily synchronize content distributed to different content directory services (CDSs); for example, a user may want to synchronize an MP3 player with a home media center in order to be able to listen to music content stored on the MP3 player through a high-quality home Hi-Fi apparatus.

FIG. 1 is a view for explaining a conventional method of synchronizing content directory service devices providing control directory services.

Referring to FIG. 1, a case is depicted wherein a user wants to synchronize control directory services between a first device CDS#1, and a second device CDS#2, by manipulation of a control point. Synchronizing the control directory services means synchronizing Digital Item Declaration Language Lite (DIDL-Lite) metadata for a plurality of directories that are to be synchronized. For example, if a directory A of the first device CDS #1 is synchronized with a directory B of the second device CDS #2, the control point will receive response messages when the control point browses the two directories A and B.

In order to synchronize two devices providing control directory services, the control point first performs synchronization setup. The synchronization setup refers to a process of providing a synchronization document to the two devices. The synchronization document for synchronizing the two devices providing the control directory services may include information regarding identifiers of devices and directories that are to be synchronized, a synchronization policy, etc.

If the synchronization setup is complete, the control point requests synchronization of the first device CDS #1 on the basis of the synchronization document in which synchronization between the first device CDS#1, and the second device CDS #2, is defined. Accordingly, the first device CDS#1, and the second device CDS #2, exchange information to be updated from their content lists, and then perform synchronization.

In the synchronization process, since a synchronization setup request, a synchronization request, the exchange of update information required for synchronization, etc., can be performed by an action provided by the control directory services, the first and second devices CDS #1 and CDS #2 which provide the control directory services can be relatively easily synchronized.

However, since the control point includes a local reproducer and a storage device, when a user tries to reproduce and store content by using the control point, a problem exists in that the control point and a different device providing a control directory service cannot be synchronized. This is because the control point cannot provide the action for performing synchronization required by a different device when the control point provides no content directory service. For example, a different device cannot browse a list of content included in the control point, and also cannot request update information required to perform synchronization with the control point.

SUMMARY OF THE INVENTION

The present invention provides a method and apparatus for synchronizing a control point providing no content directory service with a different device providing a content directory service.

According to an aspect of the present invention, there is provided a synchronization method for synchronizing a first device providing no content directory service with a second device providing a content directory service, the method including: converting information regarding a content object that is to be synchronized with the second device, among content objects of the first device, into information with a predetermined format recognizable by the content directory service; generating a synchronization document used for synchronizing content directory services, using the converted information; and providing the synchronization document to the second device.

The synchronization method includes: transmitting update information regarding content objects of the first device designated as objects that are to be synchronized in the synchronization document and a message for requesting synchronization in accordance with the synchronization document, to the second device; requesting the second device for update information regarding content objects of the second device designated as objects that are to be synchronized in the synchronization document; updating the content objects of the first device designated as the objects that are to be synchronized in the synchronization document, on the basis of the update information received from the second device, as a response to the request.

The synchronization document includes an identifier that can be used for specifying an object that is to be synchronized, from among the content objects of the first device and the second device, and information regarding a synchronization policy.

In the transmitting of the update information, the message for requesting the synchronization includes the update information of the first device or information indicating a location of the update information of the first device, such as a Uniform Resource Identifier (URI).

The message for requesting the synchronization includes information indicating that the message is transmitted from a device providing no content directory service.

A computer-readable recording medium having embodied thereon a computer program for executing the method.

According to another aspect of the present invention, there is provided a synchronization apparatus for synchronizing a first device providing no content directory service with a second device providing a content directory service, the synchronization apparatus including: an information conversion unit converting information regarding a content object that is to be synchronized with the second device, among content objects of the first device, into information with a predetermined format recognizable by the content directory service; a synchronization document generator generating a synchronization document used for synchronizing content directory services, using the information with the predetermined format; and a synchronization document providing unit providing the synchronization document to the second device.

The synchronization apparatus further including a synchronization performing unit transmitting and update information regarding content objects of the first device designated as objects that are to be synchronized in the synchronization document and a message for requesting synchronization in accordance with the synchronization document, to the second device, requesting the second device for update information regarding content objects of the second device designated as objects that are to be synchronized in the synchronization document, and updating the content objects of the first device designated as objects that are to be synchronized in the synchronization document, on the basis of the update information received from the second device as a response to the request.

BRIEF DESCRIPTION OF THE DRAWINGS

Certain features and aspects of the present invention will become more apparent by describing in detail exemplary embodiments thereof with reference to the attached drawings in which.

DETAILED DESCRIPTION OF EXEMPLARY EMBODIMENTS

Hereinafter, exemplary embodiments of the present invention will be described in detail with reference to the appended drawings.

Figure 1:
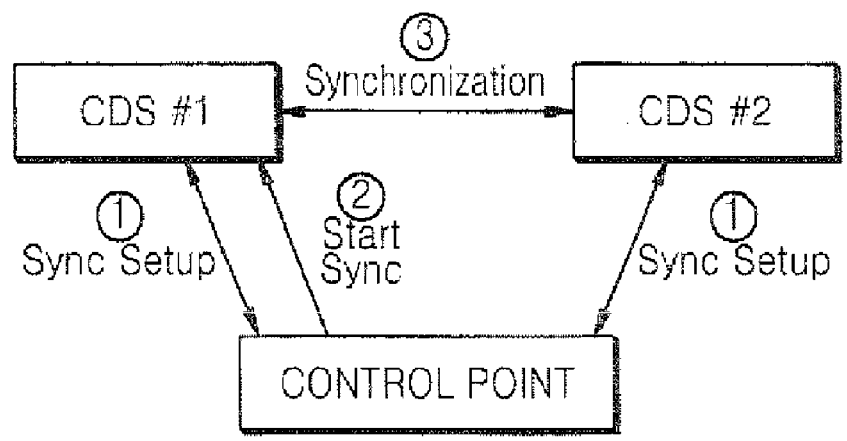
FIG. 1 is a view for explaining a conventional method of synchronizing devices that provide CDSs.
Figure 2:
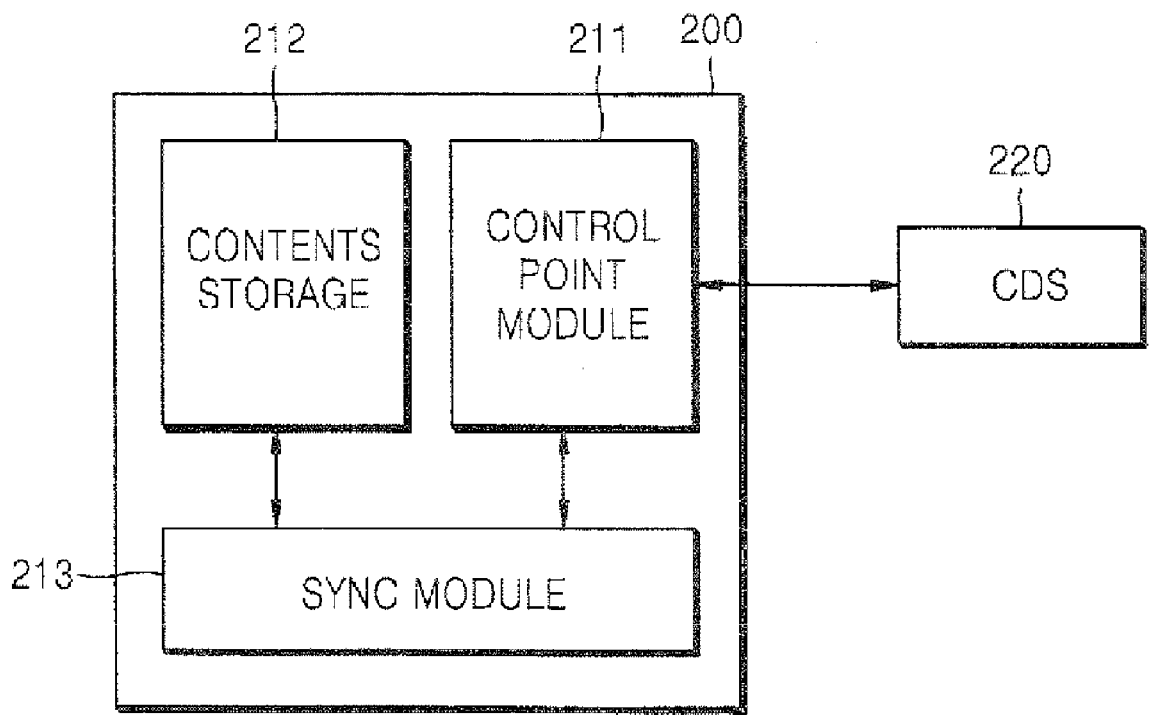
FIG. 2 is a concept view for schematically explaining a synchronization method according to an exemplary embodiment of the present invention.

FIG. 2 is a concept view for schematically explaining a synchronization method according to an exemplary embodiment of the present invention.

Referring to FIG. 2, a control point device 200 includes a control point module 211 for performing functions of a control point device, a storage unit 212 for storing content, and a synchronization module 213 for performing synchronization.

The control point device 200 cannot be easily synchronized with a CDS 220 of another party's device when the content storage unit 212 uses a different information format for managing a directory structure. This is because the control point device 200 cannot provide an action requested by the content directory service of the other party's device, and cannot substantially reflect update information acquired through the control point module 211 from the content directory service of the other party's device, in the content storage unit 212, due to this difference in the information format for managing a directory structure.

Without receiving a request from the other party's device, the synchronization module 213 converts information, which is required to allow the content directory service 220 of the other party's device to perform synchronization, into a format used by the content directory service 220. In particular, the synchronization module 213 maps information for managing a directory structure of local content to information in the format used by the content directory service 220, thereby allowing synchronization. A detailed description therefor will be given below.

Figure 3:
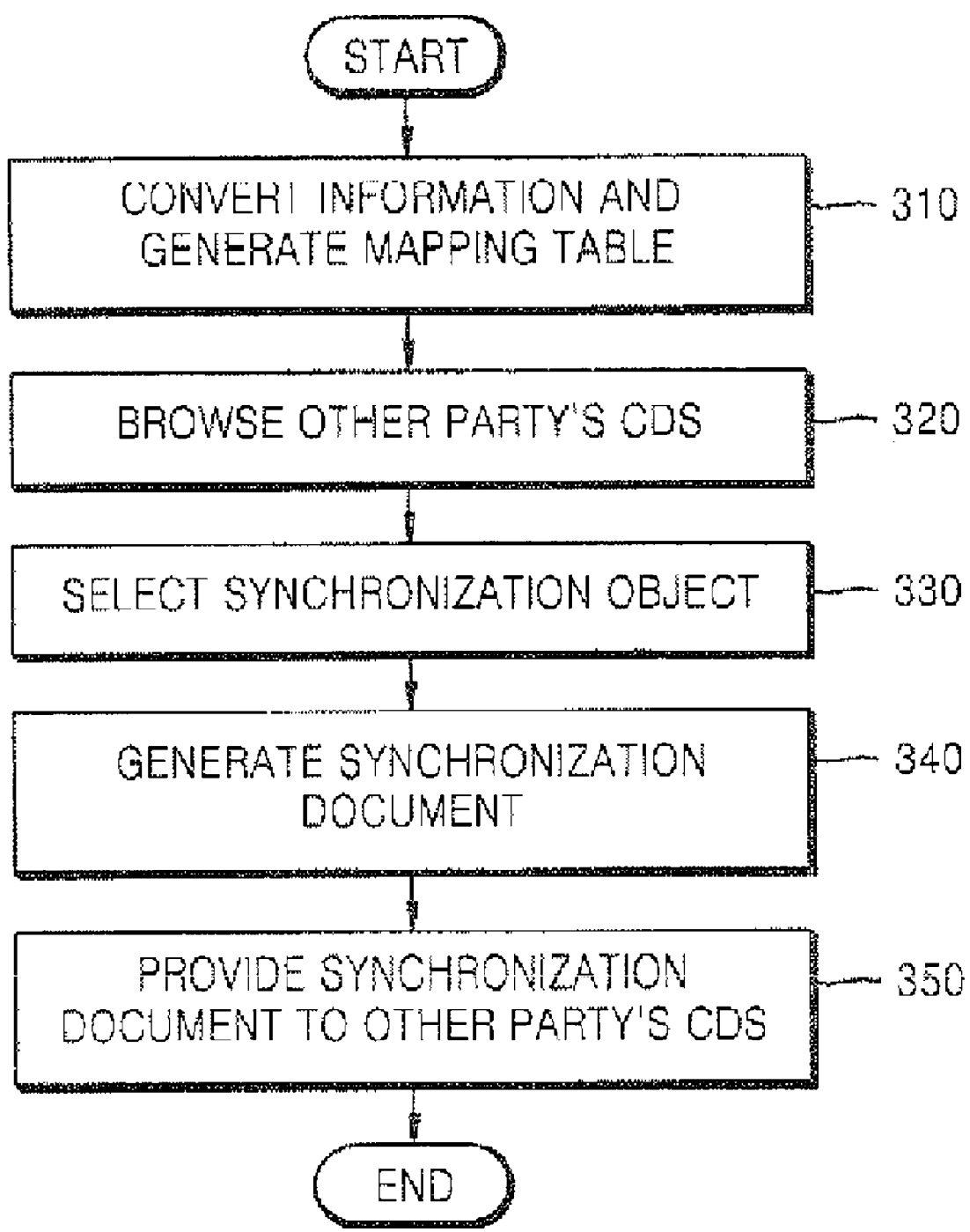
FIG. 3 is a flowchart illustrating a process of allowing a device providing no content directory service to provide a synchronization document to another device which provides the CDS, according to an exemplary embodiment of the present invention.

FIG. 3 is a flowchart illustrating a process of allowing a device which provides no content directory service to provide a synchronization document to another party's device which does provide a control directory service, according to an exemplary embodiment of the present invention. Hereinafter, a device which performs synchronization but provides no control directory service is referred to as a "control point device", and a device which is synchronized with the control point device and provides a control directory service is referred to as "the other party's device".

Referring to FIG. 3, in operation 310, a control point device converts information for content objects included in its local storage unit, into a format used to represent such content objects in a content directory service, for example, DIDL-Lite. Here, content objects mean components representing structured contents, such as files or directories, etc. Also, the control point device generates a mapping table which maps a path of local content to the information based on DIDL-Lite.

In operation 320, the control point device requests a content directory service of the other party's device for a browse action, and receives as a response a DIDL-Lite Extensible Markup Language (XML) document including metadata of content included in the other party's device.

In operation 330, the control point device selects content objects that are to be synchronized, according to a user's input. That is, the control point device determines which of the content objects to synchronize from among the content objects of the control point device and the content objects perceived by the DIDL-Lite XML document received from the other party's device.

In operation 340, if content objects that are to be synchronized are selected, a synchronization document is generated. The synchronization document includes information regarding which content object of the control point device and which content object of the other party's device must be synchronized, the type of synchronization policy, etc. The synchronization policy may be a rule regarding which objects are to be synchronized, according to the objects' content, for example, when content objects to be synchronized have different contents. Since the synchronization document is referred to by the other party's device during synchronization, the synchronization document is created in the DIDL-Lite format. Accordingly, since the synchronization document is created, the mapping table can be referred to.

In operation 350, the control point device provides the synchronization document to the other party's device. The operation 350 provides appropriate information to the content directory service of the other party's device, and sends an action request for creating the synchronization document. At this time, the synchronization document can be directly transmitted simultaneously with the action request, or a URI of the synchronization document can be provided.

Figure 4:
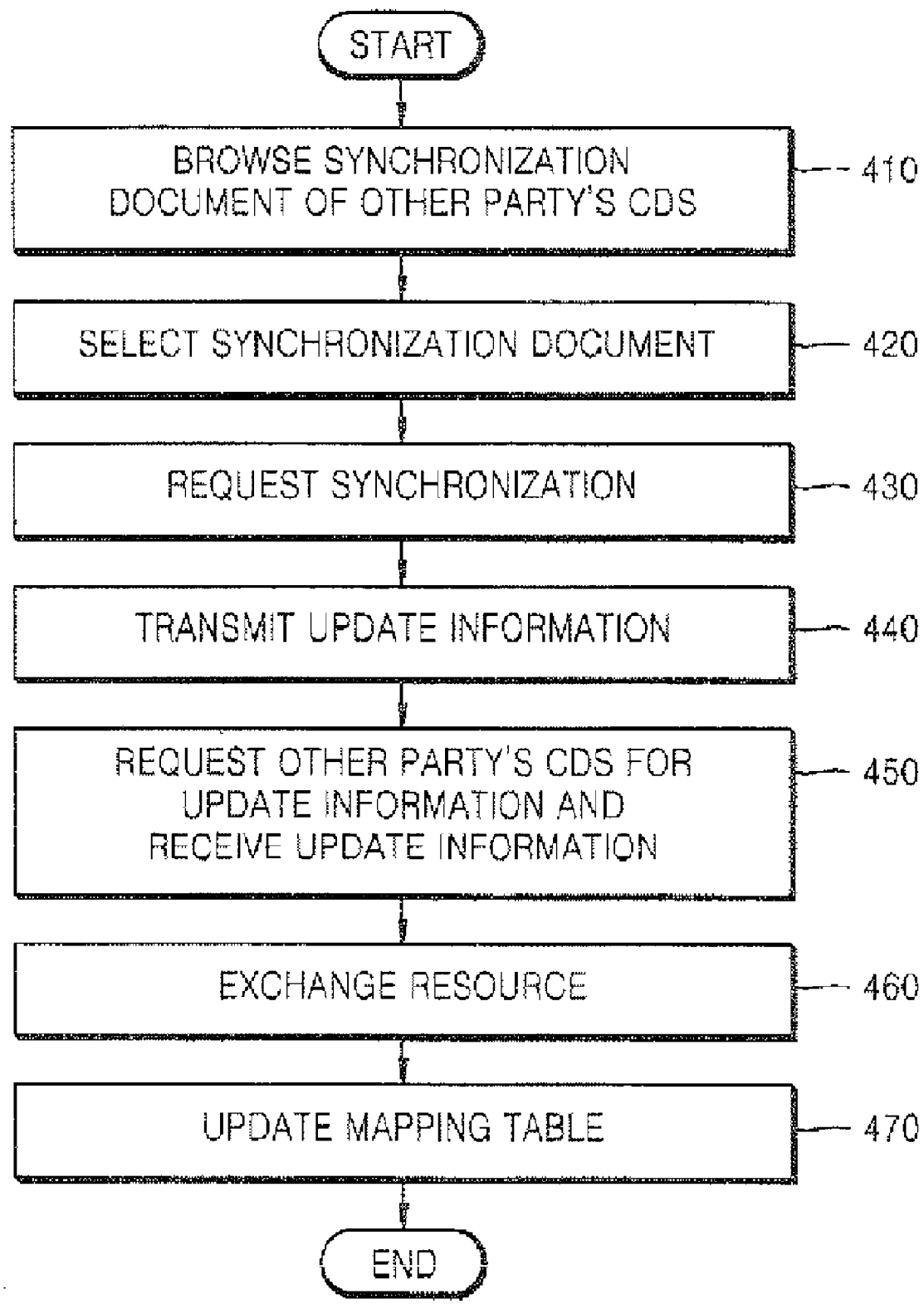
FIG. 4 is a flowchart illustrating a synchronization process according to an exemplary embodiment of the present invention.

FIG. 4 is a flowchart illustrating a synchronization process according to an exemplary embodiment of the present invention. The process illustrated in FIG. 4 proceeds under the assumption that synchronization setup is complete according to the process illustrated in FIG. 3.

In operation 410, a control point device sends a request for a browse action on synchronization documents to a content directory service of the other party's device. The other party's device can include synchronization documents received from different control point devices, as well as the synchronization document according to the synchronization setup as illustrated in FIG. 3.

In operation 420, the control point device selects the synchronization document generated in the process illustrated in FIG. 3, from among synchronization documents indicated by a response message regarding the browse action, according to a user's input.

In operation 430, the control point device notifies the other party's device about an ID of the selected synchronization document, and requests synchronization based on the synchronization document. A process of requesting synchronization according to the synchronization document involves a process of calling an action provided by a content directory service. Generally, when a device providing content directory services requests such an action from the other party's device, the requesting device calls an action for requesting update information required for synchronization from a content directory service of the other party's device.

However, since the control point device according to an exemplary embodiment of the present invention provides no content directory service, the control point device cannot respond to such a call. Accordingly, in operation 430, preferably, a control message for requesting an action of a content directory service includes information indicating that a sending device provides no content directory service. Also, if the other party's device receives the control message including the information, the other party's device does not request that the control point device provide update information for a content object that is to be synchronized.

Accordingly, in operation 440, the control point device transmits update information indicating a change in the control point device's content objects that are designated as synchronization objects in the synchronization document, to the other party's device, without the other party's request.

Since an action for transmitting update information without the other party's request is not defined in the content directory service, it is preferable in operation 450 that the control point device includes its own update information in a message for requesting update information, which is to be transmitted to the other party's device.

Meanwhile, when synchronization is initially performed, the update information of the control point device can have a large size. In this case, it is possible for the control point device to transmit the update information itself, or to transmit a URI of a DIDL-Lite XML document indicating the update information. If the URI of the DIDL-Lite XML document is transmitted, the control point device must provide the DIDL-Lite XML document when the other party's device requests the document through the corresponding URI. Accordingly, the control point device must include a Hypertext Transfer Protocol (HTTP) server.

In operation 460, the control point device uploads and/or downloads a resource on the basis of update information received from the other party's device. The other party's device also can download a resource from the control point device, as necessary. In order to allow the other party's device to download the resource from the control point device, the control point device must have an HTTP server module for providing the resource. In the case where there is only a change in the metadata of content objects that are to be synchronized, without any change in the content objects themselves, operation 460 can be omitted.

In operation 470, if the control point device finds a change in its content objects while performing synchronization, the control point device updates the mapping table on the basis of the change.

Figures 5, 6:
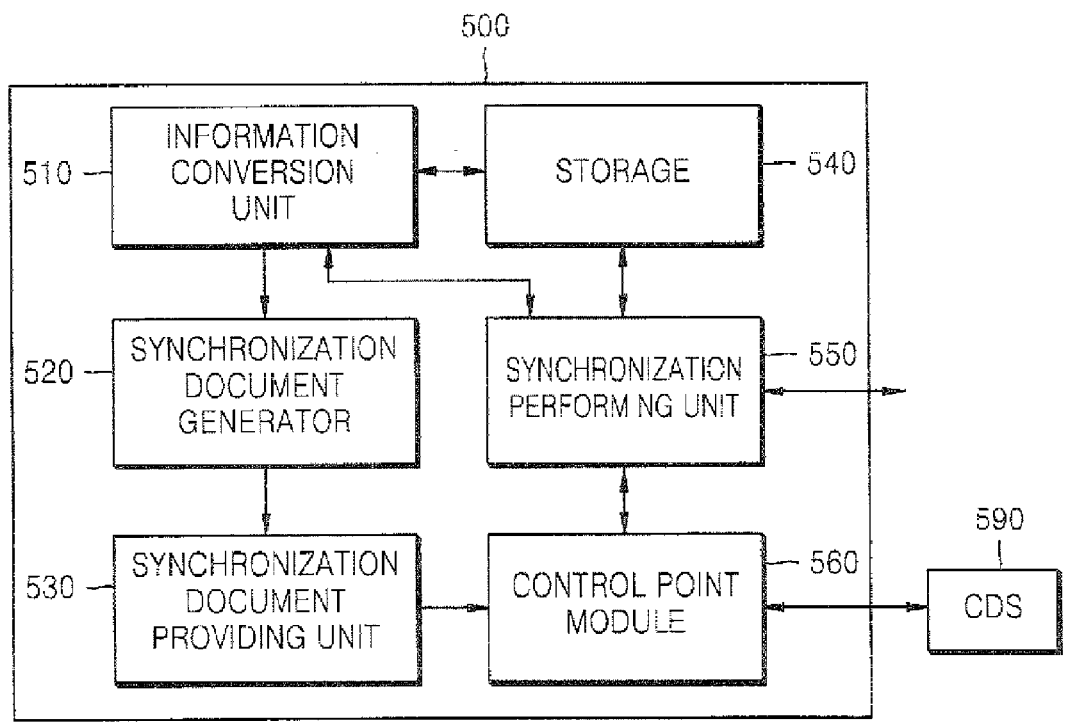
FIG. 5 is a block diagram of a synchronization apparatus according to an exemplary embodiment of the present invention.
FIG. 6 illustrates a mapping table managed by the synchronization apparatus according to an exemplary embodiment of the present invention.

FIG. 5 is a block diagram of a synchronization apparatus 500 according to an exemplary embodiment of the present invention. As illustrated in FIG. 5, the synchronization apparatus includes an information conversion unit 510, a synchronization document generator 520, a synchronization document providing unit 530, a storage unit 540, a synchronization performing unit 550, and a control point (CP) module 560.

The information conversion unit 510 converts information regarding content objects into the DIDL-Lite format recognizable by a content directory service, with reference to local contents stored in the storage unit 540, and generates a mapping table. The mapping table can be stored in the storage unit 540, or in a memory in the information conversion unit 510.

The synchronization document generator 520 generates a synchronization document with reference to the mapping table, according to a user's input. That is, as described above, the synchronization document is generated in the DIDL-Lite format.

The synchronization document providing unit 530 transmits the synchronization document to the other party's device. Since transmitting the synchronization document to the other party's device involves a process of providing appropriate information to a content directory service 590 of the other party's device, and requesting from the other party's device an action for generating a synchronization document for the other party's device, the synchronization document providing unit 530 performs the process by using the CP module 560, which performs functions of a control point device.

The synchronization performing unit 550 sends a request to the content directory service 590 of the other party's device to perform synchronization according to the synchronization document provided by the synchronization document providing unit 530.

Also, the synchronization performing unit 550 sends a request to the content directory service 590 of the other party's device for update information, receives update information as a response to the request, from the content directory service 590, and uploads and/or downloads a resource on the basis of the update information. The synchronization performing unit 550 also updates the mapping table.

The update information of the control point device 500 is transmitted to the other party's device. At this time, as described above, the update information of the control point device 500 is preferably included in a message used for requesting update information of the content directory service 590 of the other party's device. It is possible to transmit either the update information or a URI indicating the location of the update information to the other party's device. As illustrated in FIG. 5, the synchronization performing unit 550 can include an HTTP server for responding to a request for the URI of the update information and for providing a resource for synchronization when the other party's device requests the resource.

The CP module 560, which performs functions of a control point device, calls an action of the content directory service 590 of the other party's device, and receives a response from the content directory service 590.

FIG. 6 illustrates the mapping table managed by the synchronization apparatus 500 according to an exemplary embodiment of the present invention.

Referring to FIGS. 5 and 6, the mapping table managed by the synchronization apparatus 500 according to the present invention maps a path of local content, that is, information recognizable by a control point device, to information with the DIDL-Lite format recognizable by the content directory service 590 of the other party's device. Accordingly, the control point device can generate a synchronization document and update information to provide to the other party's device, with reference to the mapping table. The control point device can therefore perform synchronization by reflecting update information received from the other party's device in its own local content.

Meanwhile, the invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

As described above, according to the present invention, a control point device which contains local content but cannot provide a content directory service, can be synchronized with a UPnP media server, without loading a separate protocol stack for synchronization.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A synchronization method for synchronizing a first Universal Plug and Play (UPnP) device with a second UPnP device in a UPnP network, the method comprising:
   generating, by the UPnP first device, a synchronization document comprising an identifier that specifies an object to be synchronized from among the content objects of the first UPnP device and the second UPnP device and information regarding a synchronization policy for synchronizing content directory services that provides metadata of contents;
   providing the synchronization document to the second UPnP device; and
   synchronizing the first UPnP device and the second UPnP device based on the synchronization document, update information of the first UPnP device regarding the content objects of the first UPnP device to be synchronized, and information indicating a location from which the update information of the first UPnP device may be obtained by the second UPnP device,
   wherein the first UPnP device provides no content directory service and the second UPnP device provides a content directory service,
   wherein a format of the synchronization document is Digital Item Description Language Lite (DIDL-Lite), and
   wherein the information indicating the location comprises a Uniform Resource Identifier (URI).

2. The synchronization method of claim 1, further comprising:
   requesting, from the second UPnP device, update information regarding the content objects of the second UPnP device to be synchronized;
   updating content objects of the first UPnP device to be synchronized, based on the update information received from the second UPnP device in response to the requesting.

3. The synchronization method of claim 2, further comprising:
   transmitting an update information message regarding the content objects of the first UPnP device designated in the synchronization document as objects that are to be synchronized in the synchronization document, and the update information message comprising a message for requesting synchronization in accordance with the synchronization document, to the second UPnP device,
   wherein the message for requesting synchronization includes at least one of the update information of the first UPnP device, and the information indicating a location from which the update information of the first UPnP device may be obtained by the second UPnP device.

4. The synchronization method of claim 2, further comprising:
   transmitting an update information message regarding the content objects of the first UPnP device designated in the synchronization document as objects that are to be synchronized in the synchronization document, and the update information message comprising a message for requesting synchronization in accordance with the synchronization document, to the second UPnP device,
   wherein the message for requesting synchronization includes information indicating that the message for requesting synchronization is transmitted from a UPnP device providing no content directory service.

5. A computer-readable recording medium having embodied thereon a computer program for executing the method of claim 1.

6. The synchronization method of claim 1, further comprising:
   converting information, regarding content objects of the first UPnP device that are to be synchronized with the second UPnP device, into information with a predetermined format recognizable by the content directory service of the second UPnP device, wherein the synchronization document is generated based on the information with the predetermined format.

7. A synchronization apparatus for synchronizing a first Universal Plug and Play (UPnP) device with a second UPnP device in a UPnP network, the synchronization apparatus comprising:
   a synchronization document generator which generates a synchronization document comprising an identifier that specifies an object to be synchronized from among the content objects of the first UPnP device and the second UPnP device and information regarding a synchronization policy for synchronizing content directory services;
   a synchronization document providing unit which provides the synchronization document to the second UPnP device; and
   a synchronization performing unit that synchronizes the first UPnP device and the second UPnP device based on the synchronization document, update information of the first UPnP device regarding the content objects of the first UPnP device to be synchronized, and information indicating a location from which the update information of the first UPnP device may be obtained by the second UPnP device,
   wherein the first UPnP device provides no content directory service and the second UPnP device provides a content directory service,
   wherein a format of the synchronization document is Digital Item Description Language Lite (DIDL-Lite), and
   wherein the information indicating the location comprises a Uniform Resource Identifier (URI).

8. The synchronization apparatus of claim 7, wherein the synchronization performing unit requests, from the second UPnP device, update information regarding the content objects of the second UPnP device to be synchronized, and updates the content objects of the first UPnP device to be synchronized, based on the update information received from the second UPnP device in response to the request.

9. The synchronization apparatus of claim 8, wherein the synchronization performing unit transmits an update information message regarding the content objects of the first UPnP device designated in the synchronization document as objects that are to be synchronized, the update information message comprising a message for requesting synchronization in accordance with the synchronization document, to the second UPnP device and wherein the message for requesting synchronization includes at least one of the update information of the first UPnP device, and the information indicating a location from which the update information of the first UPnP device may be obtained by the second UPnP device.

10. The synchronization apparatus of claim 8, wherein the synchronization performing unit transmits an update information message regarding the content objects of the first UPnP device designated in the synchronization document as objects that are to be synchronized, the update information message comprising a message for requesting synchronization in accordance with the synchronization document, to the UPnP second device, and wherein the message for requesting synchronization and the request for update information include information indicating that the message for requesting synchronization is transmitted by a UPnP device providing no content directory service.

11. The synchronization apparatus of claim 7, further comprising:
   an information conversion unit which converts information, regarding content objects of the first UPnP device that are to be synchronized with the second UPnP device, into information with a predetermined format recognizable by the content directory service,
   wherein a synchronization document generator generates the synchronization document based on the information with the predetermined format.

* * * * *